Apr. 10, 1923.
C. C. FARMER
1,451,440
FLUID PRESSURE BRAKE
Filed Mar. 24, 1922
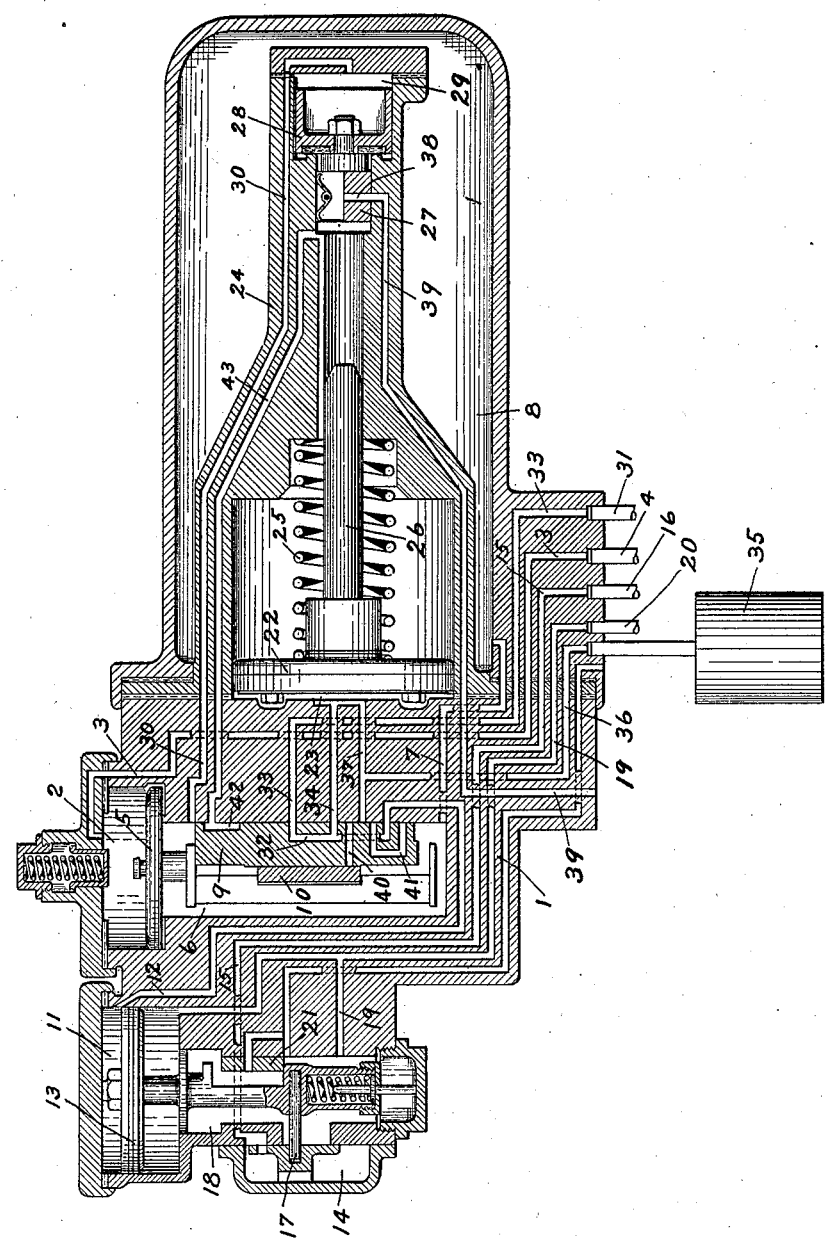
INVENTOR
CLYDE C. FARMER
BY *Wm. M. Cady*
ATTORNEYS Patented Apr. 10, 1923.

1,451,440

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 24, 1922. Serial No. 546,523.

*To all whom it may concern:*

Be it known that I, CLYDE C. FARMER, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brakes, and more particularly to a locomotive brake equipment.

The locomotive brake equipment quite generally employed on railways at the present time comprises an equalizing valve device, similar to the usual triple valve device employed on cars, but adapted to supply fluid from a pressure chamber, corresponding with the ordinary auxiliary reservoir, to an application chamber, instead of directly to the brake cylinder. An application piston subject to the opposing pressures of the application chamber and the brake cylinder then operates a valve for controlling the supply of fluid under pressure from the main reservoir to the brake cylinder.

When a brake cylinder piston is moved out by fluid supplied to the brake cylinder through the operation of a triple valve device, a certain amount of fluid is required to fill the vacuum space created by the movement of the brake cylinder piston, before any effective pressure is exerted on the piston, while on the locomotive, since the application chamber is initially filled with fluid at atmospheric pressure, the same amount of fluid from the pressure chamber supplied to the application chamber, as is supplied from the auxiliary reservoir to the brake cylinder on a car, will produce a higher pressure in the application chamber and consequently, a higher initial pressure is obtained in the brake cylinders on the locomotive than is obtained on the cars, which results in a more rapid reduction in speed of the locomotive as compared with the cars and this tends to cause a running in of the slack of the train toward the locomotive, thus producing shocks.

The principal object of my invention is to provide means for ensuring that substantially the same working pressure will be obtained in the brake cylinders on the locomotive as on the cars when an application of the brakes is effected.

In order to accomplish the above object, I propose to provide a displacement piston which is moved out by fluid supplied from the pressure chamber of the equalizing valve device to the application chamber, so that the effect is the same as though fluid were supplied directly to the brake cylinder, as on the cars, and thus the effective brake cylinder pressure on the locomotive will correspond substantially with that obtained on the cars.

In the accompanying drawing, the single figure is a diagrammatic central section of a locomotive distributing valve device embodying my invention.

As shown in the drawing, the distributing valve device may comprise a sectional casing 1 containing an equalizing valve device and an application valve device. The equalizing valve device comprises a piston chamber 2, connected by passage 3 to the usual automatic brake pipe 4 and containing a piston 5 and a valve chamber 6, connected by passage 7 to a pressure chamber 8 and containing a main slide valve 9 and a graduating slide valve 10 adapted to be operated by piston 5.

The application valve device comprises an application cylinder 11, having a passage 12, leading to the seat of slide valve 9, and containing application piston 13, a valve chamber 14, connected by passage 15 to main reservoir pipe 16 and containing an application valve 17 adapted to be operated by piston 13, and a valve chamber 18, connected by passage 19 to locomotive brake cylinder pipe 20 and containing a release valve 21 and adapted to be operated by piston 13.

According to my invention, a displacement piston 22 may be provided, which is contained in a piston chamber 23 formed in a casing 24 which for compactness may be contained in the pressure chamber 8. The piston 22 is subject on one side to the pressure of a spring 25 and on the spring side, the piston is provided with a stem 26 which is adapted to operate a slide valve 27, when the piston 22 moves out. For returning the valve 27 to its normal release position, a valve piston 28 is provided, the piston chamber 29 of which is connected by passage 30 with the valve chamber 6 when the slide valve 9 is in normal release position.

In operation, as in the usual locomotive brake equipment, fluid supplied to the brake pipe 4 flows to piston chamber 2 of the equalizing valve device and thence through the usual feed groove around the equalizing piston 5 to valve chamber 6 and from valve chamber 6 through passage 7, charging the pressure chamber 8. In the release position of the equalizing valve device, the application cylinder 11 is connected to the release pipe 31 through passage 12, cavity 32 in slide valve 9, and passage 33. The piston chamber 23 of the displacement piston 22 is connected to the release pipe 31, through passage 34 and cavity 32, and application chamber 35 is also connected to the release pipe 31, through passage 36, which is connected to a pasage 37, leading from piston chamber 23 to the seat of the slide valve 9.

The application cylinder 11, the application chamber 35, and the displacement piston chamber 23 are thus subject to atmospheric pressure in the release position and the spring 25 then maintains the piston 22 in the position shown in the drawing. The piston chamber 29 being subject to pressure from the pressure chamber 8 as supplied through passage 30, the valve piston 28 will be shifted to its seated position, holding the valve 27 in release position, as shown in the drawing. In this position, the valve 27 connects the chamber at the spring side of piston 22, through port 38 with an exhaust passage 39.

When the brake pipe pressure is reduced to effect a service application of the brakes, the equalizing piston 5 shifts the main slide valve 9 and the graduating valve 10, so that port 40 is uncovered and registers with passage 34 and consequently fluid under pressure from valve chamber 6 and the pressure chamber 8 is supplied to the displacement piston chamber 23 and from chamber 23 through passage 37 to application chamber 35 and through passage 37, cavity 41 in slide valve 9 and passage 12 to the application cylinder 11. Fluid thus supplied to the piston chamber 23 shifts the displacement piston 22 outwardly, so that fluid supplied from the pressure chamber 8 by operation of the equalizing valve device, must equalize into the space provided by the movement of piston 22 as well as into the application chamber 35 and the application cylinder 11.

It will thus be seen that the pressure in the application cylinder is less than it would otherwise be and by making the displacement space of the proper volume, the pressure in the application cylinder and thus in the locomotive brake cylinders may be made to substantially correspond with the pressure obtained in the brake cylinder on a car, for a given reduction in brake pipe pressure.

As the piston 22 moves out, the stem 26 engages the valve 27 and shifts same so as to cut off communication from the spring chamber to the atmosphere, the object being to prevent the possible escape of fluid pressure from the piston chamber 23, which might leak past the piston packing of the piston 22 to the spring side of the piston. The above described movement of the valve 27 by the stem 26 is not opposed by the valve piston 28, since the movement of slide valve 9 to application position connects passage 30, through a cavity 42, with passage 43, leading to the chamber at the spring side of piston 22, so that chamber 29 is vented to the atmosphere through port 38 in slide valve 27.

Fluid under pressure, supplied to the application cylinder 11, operates the application piston 13 so as to move the release valve 21 to cut off the brake cylinder exhaust and move the application valve 17 so as to admit fluid from the main reservoir to the brake cylinder in the usual manner.

When the brake pipe pressure is increased to effect the release of the brakes, the equalizing piston 5 is shifted to release position, in which the displacement piston chamber 23, the application cylinder 11, and the application chamber 35 are connected to the exhaust through cavity 32 in the slide valve 9. Fluid pressure being released from the piston 22, the spring 25 returns said piston to its normal release position and since fluid under pressure is supplied in the release position of slide valve 9 from valve chamber 6, through passage 30 to piston chamber 29, the valve piston 28 will be shifted so as to move the valve 27 to its release position, as shown in the drawing, leakage from the valve chamber 6 past the valve piston 28 being prevented by the seating of the valve piston.

When a sudden reduction in brake pipe pressure is made to effect an emergency application of the brakes, the equalizing piston 5 makes its full traverse and the slide valve 9 is moved to a position in which the passage 12, leading to the application cylinder 11 is uncovered so that fluid is supplied from the pressure chamber 8 directly to the application cylinder. In this position, the application chamber 35 and the displacement piston chamber 23 are cut off, so that the displacement piston does not function in an emergency application of the brakes.

Having now described my invention, what I claim as new and desire to secure by Letters Patent is:—

1. In a fluid pressure brake, the combination with a brake pipe, an application cylinder, a pressure chamber, a piston chamber, and an equalizing valve device operated upon a reduction in brake pipe pressure for supplying fluid under pressure from the pressure chamber to the application cylinder and to said piston chamber, of a piston in said piston chamber movable by fluid pressure supplied to said piston chamber.

2. In a fluid pressure brake, the combination with a brake pipe and an application cylinder, of a piston chamber containing a piston movable by fluid under pressure supplied to the application cylinder.

3. In a fluid pressure brake, the combination with a brake pipe, brake cylinder, an application cylinder, means operated upon an increase in pressure in the application cylinder for supplying fluid to the brake cylinder, a pressure chamber and an equalizing valve device operated upon a reduction in brake pipe pressure for supplying fluid from the pressure chamber to the application cylinder, of a displacement piston movable by fluid supplied to the application cylinder.

4. In a fluid pressure brake, the combination with an application cylinder, an increase in pressure in which is adapted to effect an application of the brakes, of a piston operated by fluid supplied to the application cylinder for creating a displacement volume open to the application cylinder.

5. In a fluid pressure brake, the combination with an application cylinder, of a piston chamber, a piston in said chamber operated by fluid supplied to said chamber, an exhaust port normally open to the non-pressure side of the piston and means operated by the movement of said piston for closing communication through said exhaust port.

6. In a fluid pressure brake, the combination with an application cylinder, of a piston chamber, a piston in said chamber operated by fluid supplied to said chamber, an exhaust port normally open to the non-pressure side of the piston and a valve operated by said piston for closing said exhaust port.

7. In a fluid pressure brake, the combination with an application cylinder, of a piston chamber, a piston in said chamber operated by fluid supplied to said chamber, an exhaust port normally open to the non-pressure side of the piston and a valve operated by said piston for closing said exhaust port and means operated upon releasing the brakes for shifting said valve to open said exhaust port.

8. In a fluid pressure brake, the combination with a brake controlling valve device having an application cylinder, of a dummy brake cylinder connected to said application cylinder in applying the brakes.

In testimony whereof I have hereunto set my hand.

CLYDE C. FARMER.